US012770928B2

(12) United States Patent
Lee et al.

(10) Patent No.: US 12,770,928 B2
(45) Date of Patent: Oct. 20, 2026

(54) ELECTRODE ASSEMBLY AND ELECTROCHEMICAL DEVICE INCLUDING THE SAME

(71) Applicant: LG ENERGY SOLUTION, LTD., Seoul (KR)

(72) Inventors: So-Yeong Lee, Daejeon (KR); Won-Sik Bae, Daejeon (KR); Kyung-Tae Kim, Daejeon (KR); So-Jung Park, Daejeon (KR); Kyeong-Hui Bae, Daejeon (KR); So-Mi Jeong, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 615 days.

(21) Appl. No.: 18/273,639

(22) PCT Filed: Jan. 12, 2023

(86) PCT No.: PCT/KR2023/000600
§ 371 (c)(1),
(2) Date: Jul. 21, 2023

(87) PCT Pub. No.: WO2023/136638
PCT Pub. Date: Jul. 20, 2023

(65) Prior Publication Data

US 2024/0304868 A1 Sep. 12, 2024

(30) Foreign Application Priority Data

Jan. 13, 2022 (KR) ........................ 10-2022-0005284

(51) Int. Cl.
*H01M 10/0583* (2010.01)
*H01M 10/052* (2010.01)
(Continued)

(52) U.S. Cl.
CPC ..... *H01M 10/0583* (2013.01); *H01M 10/052* (2013.01); *H01M 50/417* (2021.01);
(Continued)

(58) Field of Classification Search
CPC ........... H01M 10/0583; H01M 10/052; H01M 50/489; H01M 50/417; H01M 50/457;
(Continued)

(56) References Cited

U.S. PATENT DOCUMENTS 10,833,349 B2 * 11/2020 Nakai ............... H01M 10/0459
10,971,783 B2 * 4/2021 Kim .................... H01M 50/451
(Continued)

FOREIGN PATENT DOCUMENTS

CN 111668431 A 9/2020
CN 112054149 A 12/2020
(Continued)

OTHER PUBLICATIONS

DE_102016204372 English Translation (Year: 2016).*
(Continued)

*Primary Examiner* — Jimmy Vo
(74) *Attorney, Agent, or Firm* — Birch, Stewart, Kolasch & Birch, LLP

(57) ABSTRACT

A separator, an electrode assembly and an electrochemical device including the same are provided. The separator is used for a zigzag stacking-type electrode assembly, and includes a porous substrate made of a polymer material and a porous coating layer formed on opposite surfaces of the porous substrate and containing inorganic particles. A thickness (Ts) of the porous substrate decreases gradually from opposite ends toward a central portion based on a longitudinal direction of the separator, a total thickness (Tc) of the
(Continued)

porous coating layers increases gradually toward the central portion, and a total thickness (Ts+Tc) of the separator is constant.

18 Claims, 7 Drawing Sheets

(51) Int. Cl.

| | |
|---|---|
| ***H01M 50/417*** | (2021.01) |
| ***H01M 50/431*** | (2021.01) |
| ***H01M 50/443*** | (2021.01) |
| ***H01M 50/451*** | (2021.01) |
| ***H01M 50/457*** | (2021.01) |
| ***H01M 50/46*** | (2021.01) |
| ***H01M 50/466*** | (2021.01) |
| ***H01M 50/489*** | (2021.01) |

(52) U.S. Cl.
CPC ....... *H01M 50/431* (2021.01); *H01M 50/443* (2021.01); *H01M 50/451* (2021.01); *H01M 50/457* (2021.01); *H01M 50/46* (2021.01); *H01M 50/466* (2021.01); *H01M 50/489* (2021.01)

(58) Field of Classification Search
CPC .. H01M 50/46; H01M 50/443; H01M 50/451; H01M 50/446; H01M 50/431
See application file for complete search history.

(56) References Cited

U.S. PATENT DOCUMENTS

| | | | | |
|---|---|---|---|---|
| 10,998,599 | B2 | 5/2021 | Cho et al. | |
| 2013/0101876 | A1 | 4/2013 | Ueki et al. | |
| 2019/0355951 | A1* | 11/2019 | Lee | H01M 50/443 |
| 2023/0036396 | A1 | 2/2023 | Hosokawa et al. | |

FOREIGN PATENT DOCUMENTS

| | | | | |
|---|---|---|---|---|
| DE | 102016204372 | A1 * | 9/2016 | H01G 11/26 |
| EP | 2985813 | A1 * | 2/2016 | H01M 10/0525 |
| JP | 2014-235835 | A | 12/2014 | |
| KR | 10-2016-0111855 | A | 9/2016 | |
| KR | 10-2016-0131881 | A | 11/2016 | |
| KR | 10-1718970 | B1 | 3/2017 | |
| KR | 10-2017-0092288 | A | 8/2017 | |
| KR | 10-2018-0032763 | A | 4/2018 | |
| KR | 10-2018-0092364 | A | 8/2018 | |
| KR | 10-2065734 | B1 | 1/2020 | |
| KR | 102069354 | B1 * | 1/2020 | H01M 10/0436 |
| KR | 102143361 | B1 * | 8/2020 | B65D 25/02 |
| KR | 10-2020-0129650 | A | 11/2020 | |
| KR | 10-2020-0145375 | A | 12/2020 | |
| KR | 10-2021-0026537 | A | 3/2021 | |
| KR | 10-2256438 | B1 | 6/2021 | |
| WO | WO 2011/155060 | A1 | 12/2011 | |
| WO | WO-2012124093 | A1 * | 9/2012 | H01M 50/451 |
| WO | WO-2015065118 | A1 * | 5/2015 | H01M 4/622 |
| WO | WO 2021/131879 | A1 | 7/2021 | |

OTHER PUBLICATIONS

EP_2985813 English Translation (Year: 2016).*
KR_102069354 English Translation (Year: 2020).*
KR_102143361 English Translation (Year: 2020).*
WO_2012124093 English Translation (Year: 2012).*
WO_2015065118 English Translation (Year: 2015).*
Extended European Search Report for European Application No. 23740481.9, dated Feb. 27, 2025.
International Search Report (PCT/ISA/210) issued in PCT/KR2023/000600, dated Apr. 20, 2023.

* cited by examiner

ELECTRODE ASSEMBLY AND ELECTROCHEMICAL DEVICE INCLUDING THE SAME

TECHNICAL FIELD

The present disclosure relates to an electrode assembly and an electrochemical device including the same. Particularly, the present disclosure relates to a zigzag-stacked electrode assembly and a secondary battery including the same.

The present application claims priority to Korean Patent Application No. 10-2022-0005284 filed on Jan. 13, 2022 in the Republic of Korea, the disclosures of which are incorporated herein by reference.

BACKGROUND ART

Secondary batteries may be classified depending on the type of an electrode assembly having a positive electrode/separator/negative electrode structure. Typically, such electrode assemblies may be classified into jelly-roll (wound) type electrode assemblies having a structure including elongated sheet-like positive electrodes and negative electrodes with a separator between a positive electrode and a negative electrode, and stacked (laminated) electrode assemblies including a plurality of positive electrodes and negative electrodes cut into units having a predetermined size and stacked sequentially with a separator between a positive electrode and a negative electrode. However, such conventional electrode assemblies have some problems.

First, the jelly-roll electrode assembly is formed in a cylindrical or oval shape in its section by winding an elongated sheet-like positive electrode and negative electrode in a compact state, and thus the stress caused by the swelling and shrinking of the electrodes during charge/discharge is accumulated inside the electrode assembly, resulting in deformation of the electrode assembly when such stress accumulation exceeds a certain limit. Due to the deformation of the electrode assembly, the interval between electrodes becomes non-uniform to cause the problems of rapid degradation of the performance of the battery and threatening of the safety of the battery resulting from an internal short-circuit. In addition, it is required to wind an elongated sheet-like positive electrode and negative electrode, but it is difficult to wind the electrodes rapidly while maintaining a constant interval between the positive electrode and the negative electrode. Therefore, there is another problem of degradation of the productivity.

Second, the stacked electrode assembly requires sequential stacking of a plurality of positive electrode and negative electrode units. Therefore, a separate step of transferring electrode plates is required to obtain such units, and the sequential stacking process requires a lot of time and labor, resulting in poor productivity.

FIG. 1 is a schematic sectional view illustrating the structure of a stacked electrode assembly.

Referring to FIG. 1, there has been developed, as a stacked electrode assembly, a zigzag stacking (ZZS)-type electrode assembly 1 formed by stacking a positive electrode 5 and a negative electrode 7 with a separator 3 interposed between both electrodes, in multiple layers in a zigzag manner.

A battery has been manufactured by assembling such a zigzag stacking-type electrode assembly and then finally fixing the electrode assembly through a hot pressing process. Herein, heat and pressure are transferred to a higher degree at the endmost region of the electrode assembly that is in contact with the hot press to cause the problem of degradation of the electrode-separator adhesion in the electrode assembly, resulting in poor quality of the electrode assembly.

DISCLOSURE

Technical Problem

The present disclosure is designed to solve the problems of the related art, and therefore the present disclosure is directed to providing a novel structure of a separator which can retain a predetermined level of electrode-separator adhesion when forming a zigzag stacking (ZZS)-type electrode assembly, and an electrode assembly including the same.

Particularly, the present disclosure is directed to providing a novel structure of a separator which shows excellent electrode-separator adhesion even in a region inside of an electrode assembly to which heat and pressure are transferred to a relatively lower degree as compared to the top most and the bottommost regions of the electrode assembly, which are in contact with a hot press, as viewed from the stacking direction, in a hot pressing step for forming an electrode assembly, and an electrode assembly including the same.

Technical Solution

In one aspect of the present disclosure, there is provided a separator according to any one of the following embodiments.

According to the first embodiment, there is provided a separator including a porous substrate made of a polymer material: a first porous coating layer on a first surface of the porous substrate, the first porous coating layer containing inorganic particles; and a second porous coating layer on a second surface of the porous substrate opposite the first surface, the second porous coating layer containing inorganic particles, wherein the separator has opposite ends and a central portion, wherein a thickness Ts of the porous substate decreases gradually from the opposite ends toward the central portion based on a longitudinal direction of the separator, wherein a total thickness Tc of the first and second porous coating layers increases gradually from the opposite ends toward the central portion, and wherein a total thickness Ts+Tc of the separator is constant.

According to the second embodiment, there is provided the separator as defined in the first embodiment, wherein the thickness Ts of the porous substrate is constant from the longitudinal center C of the separator to a first predetermined position A in a direction toward a first end E of the opposite ends and to a second predetermined position A' in a direction toward a second end (E') of the opposite ends, and wherein the thickness Ts of the porous substrate in a whole or at least a part of a first region AE from the first predetermined position A to the first end E and a second region A'E' from the second predetermined position A' to the second end E' decreases gradually toward the central portion of the separator, while the total thickness Te of the first and second porous coating layers increases toward the central portion.

According to the third embodiment, there is provided the separator as defined in the first or the second embodiment, wherein the first and second porous coating layers are symmetrical to each other based on the central portion of the separator in the longitudinal direction of the separator, and a thickness of the first porous coating layer and a thickness of the second porous coating layer are the same or have a difference in thickness of 10% or less at a same position orthogonal to the longitudinal direction of the separator.

According to the fourth embodiment, there is provided the separator as defined in any one of the first to the third embodiments, wherein the separator is symmetrical based on the longitudinal center C in the longitudinal direction, and wherein the thickness Ts of the porous substrate in the first region AE and the thickness Ts of the porous substrate in the second region A'B' at positions spaced apart from the longitudinal center C of the separator by the same interval are the same or have a difference in thickness of 10% or less.

According to the fifth embodiment, there is provided the separator as defined in any one of the first to the fourth embodiments, wherein a ratio Ts/Tc of the thickness Ts of the porous substrate and the total thickness Te of the first and second porous coating layers is 0.5-5 over the whole separator.

According to the sixth embodiment, there is provided the separator as defined in any one of the first to the fifth embodiments, wherein a ratio Ts/Tc of the thickness Ts of the porous substrate and the total thickness Tc of the first and second porous coating layers is 1-5 at the position A.

In another aspect of the present disclosure, there is provided an electrode assembly according to any one of the following embodiments.

According to the seventh embodiment, there is provided an electrode assembly including unit electrodes and the separator as defined in any one of the first to sixth embodiments, wherein the separator is folded in a zigzag manner and the unit electrodes are located at portions where the separator is overlapped.

According to the eighth embodiment, there is provided the electrode assembly as defined in the seventh embodiment, wherein the thickness Ts of the porous substrate is constant from the longitudinal center C of the separator to a first predetermined position A in a direction toward a first end (E) of the opposite ends and to a second predetermined position A' in a direction toward a second end (E') of the opposite ends, wherein a first region AE from the first predetermined position A to the first end E and a second region A'E' from the second predetermined position A' to the second end E' are totally or at least partially disposed at a topmost end and a bottommost end based on a stacking direction of the electrode assembly, and wherein the thickness Ts of the porous substrate decreases gradually toward the central portion of the separator, while the total thickness Tc of the first and second porous coating layers increases toward the central portion.

According to the ninth embodiment, there is provided the electrode assembly as defined in the seventh or the eighth embodiment, wherein a region AA' from the first predetermined position A to the second predetermined position A' is not disposed at the topmost end and the bottommost end based on the stacking direction of the electrode assembly, and wherein the thickness Ts of the porous substrate at the topmost end and the bottommost end based on the stacking direction of the electrode assembly decreases toward the central portion of the separator.

According to the tenth embodiment, there is provided the electrode assembly as defined in any one of the seventh to the ninth embodiments, wherein adhesion between one of the unit electrodes and the separator at a position other than the topmost end and the bottommost end of the electrode assembly, after being fixed through a hot pressing process, is at least 20% based on 100% of the adhesion between another one of the unit electrodes and the separator at the topmost end in the stacking direction of the electrode assembly.

According to the eleventh embodiment, there is provided the electrode assembly as defined in any one of the seventh to the tenth embodiments, wherein the adhesion between the one of the unit electrodes and the separator at the position other than the topmost end and the bottommost end is 20 gf/25 mm or more.

According to the twelfth embodiment, there is provided the electrode assembly as defined in any one of the seventh to the eleventh embodiments, wherein the central portion of the separator, after being fixed through a hot pressing process, has a lower air permeability as compared to the air permeability of the opposite ends of the separator.

According to the thirteenth embodiment, there is provided the electrode assembly as defined in any one of the seventh to the twelfth embodiments, wherein the thickness Ts of the porous substrate is constant from a longitudinal center C of the separator to a first predetermined position A in a direction toward a first end (E) of the opposite ends and to a second predetermined position A' in a direction toward the second end (E') of the opposite ends, wherein the thickness Ts of the porous substrate in a whole or at least a part of a first region AE from the first predetermined position A to the first end E and a second region A'E' from the second predetermined position A' to the second end E' decreases gradually toward the central portion of the separator, while the total thickness Tc of the first and second porous coating layers increases toward the central portion, and wherein a region AA' between the first predetermined position A and the second predetermined position A' has an air permeability of 50% or more based on the air permeability of at least one of the first region AE and the second region A'E', after being fixed through a hot pressing process.

In still another aspect of the present disclosure, there is provided an electrochemical device according to any one of the following embodiments.

According to the fourteenth embodiment, there is provided an electrochemical device including the electrode assembly as defined in any one of the seventh to the thirteenth embodiments, wherein the electrode assembly is received in a battery casing.

According to the fifteenth embodiment, there is provided the electrochemical device as defined in the fourteenth embodiment, which is a lithium secondary battery.

Advantageous Effects

The electrode assembly according to an embodiment of the present disclosure may show excellent adhesion between the electrode and the separator even in the inner part of the electrode assembly to which heat and pressure are transferred to a relatively lower degree as compared to the topmost portion and the bottommost portion in the stacking direction, when it is fixed through a hot pressing process.

In addition, when using the electrode assembly according to an embodiment of the present disclosure, the problem of an increase in interfacial resistance between the electrode and the separator, caused by low adhesion according to the related art, may be effectively improved by virtue of such excellent internal adhesion. Therefore, it is possible to provide a battery having excellent characteristics in terms of capacity retention and inhibition of thickness swelling.

BEST MODE

Figure 1:
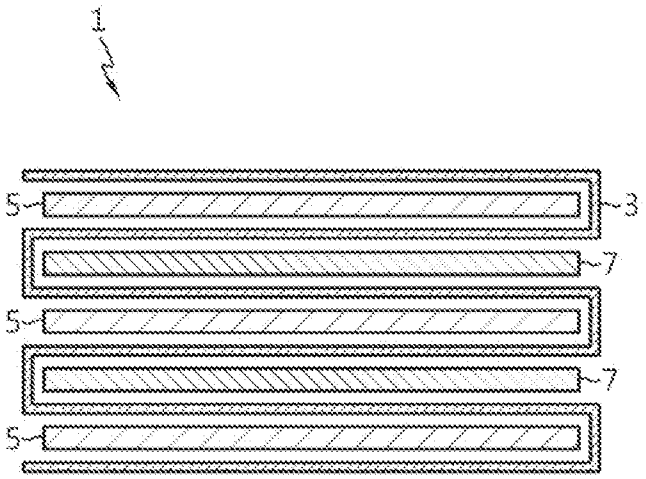
FIG. 1 is a schematic section view illustrating an embodiment of a zigzag stacking (ZZS)-type electrode assembly.

Hereinafter, preferred embodiments of the present disclosure will be described in detail.

Throughout the specification, the expression 'a part includes or comprises an element' does not preclude the presence of any additional elements but means that the part may further include the other elements.

As used herein, the terms 'approximately', 'substantially', or the like, are used as meaning contiguous from or to the stated numerical value, when an acceptable preparation and material error unique to the stated meaning is suggested, and are used for the purpose of preventing an unconscientious invader from unduly using the stated disclosure including an accurate or absolute numerical value provided to help understanding of the present disclosure.

As used herein, the expression 'A and/or B' means 'A, B or both of them'.

Specific terms used in the following description are for illustrative purposes and are not limiting. The term, such as 'top', 'bottom', 'left', 'right', 'front', 'rear', 'internal' or 'external' showing a direction indicates the direction in the drawings to which it is referred, or indicates the direction toward the geometrical center of the corresponding apparatus, system and members thereof, or the direction away from the same.

The present disclosure relates to a separator for an electrochemical device and an electrode assembly including the same. For example, the electrochemical device may include a primary battery, a secondary battery, a super capacitor, an electric double layer capacitor, or the like. More particularly, the secondary battery may be a lithium-ion secondary battery.

According to an embodiment of the present disclosure, the separator may be used for a ZZS-type electrode assembly including a separator folded in a zigzag manner, and unit electrodes inserted to regions where the separator is overlapped, but the scope of the present disclosure is not limited thereto.

According to an embodiment of the present disclosure, the electrode assembly includes unit electrodes and a strip-like separator, and has a zigzag stacking (ZZS)-type electrode assembly structure wherein the separator is folded in a zigzag manner so that the unit electrodes may be inserted to portions where the separator is overlapped.

Hereinafter, the separator, the electrode assembly and each constitutional element contained in the electrode assembly will be explained in more detail with reference to the accompanying drawings.

The separator includes a porous substrate made of a polymer material, and porous coating layers formed on both surfaces of the porous substrate and containing inorganic particles, wherein the thickness Ts of the porous substrate decreases gradually from both end portions toward the central portion based on the longitudinal direction of the separator, the total thickness Tc of the porous coating layers increases gradually toward the central portion, and the total thickness Ts+Tc of the whole separator is maintained constantly.

Figure 2:
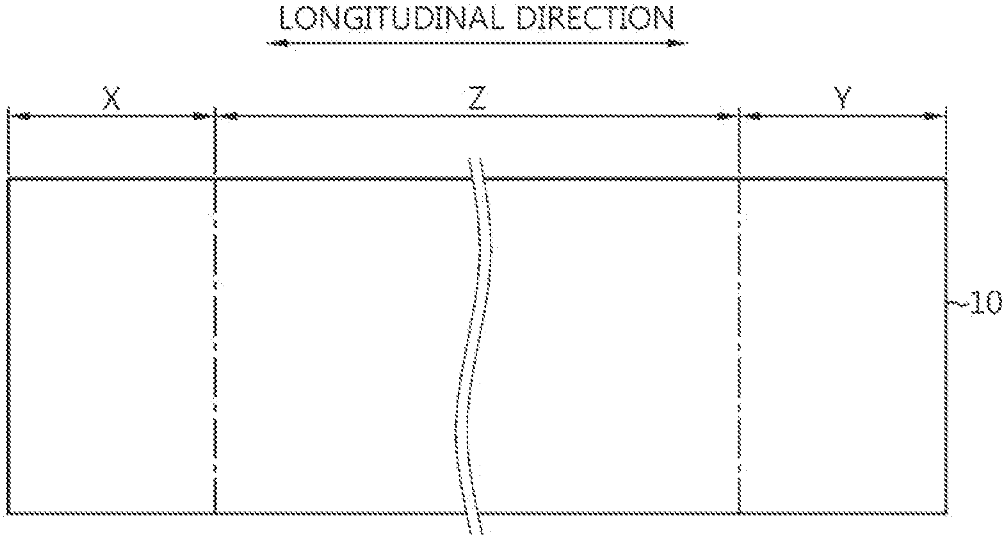
FIG. 2 is a schematic view illustrating the top surface of the strip-like separator according to an embodiment of the present disclosure.

As used herein, the term 'longitudinal direction' of the separator refers to a direction along which two or more unit electrodes are disposed on the strip-like separator. For example, the separator has an aspect ratio of larger than 1, and the term 'longitudinal direction' refers to the direction of the longer side of the width and length of the separator. FIG. 2 is a schematic view illustrating the separator according to an embodiment of the present disclosure. Referring to FIG. 2, the separator according to an embodiment of the present disclosure may have a rectangular shape having an aspect ratio of larger than 1, and the width direction, which is the direction of the longer side of the width and length of the rectangular shape may be defined as 'longitudinal direction' Herein, when forming an electrode assembly using the separator, the unit electrodes may be disposed in the width direction (i.e. longitudinal direction) of the separator.

As used herein, the term 'stacking direction' of the electrode assembly refers to the height direction along which the unit cells are stacked when the separator is folded in a zigzag manner and the unit electrodes are inserted to portions where the separator is overlapped upon the assemblage of the electrode assembly.

As used herein, the expression 'thickness is maintained constantly in a specific region' means that the thickness values measured at optional positions in the specific region by the same method are within an error range of 5% or less. Particularly, when the thickness values measured at two optional points in the specific region show a deviation of 5% less, 4% or less, 3% or less, 2% or less, or 0% (no difference), it can be said that the thickness is maintained constantly.

As used herein, the expression 'thickness increases gradually in a specific region' means that the thickness values measured in the specific region according to a constant directionality by the same method increase continuously or discontinuously. The ratio of such an increase in thickness may be maintained constantly within an error range of 5% or less, or may vary discontinuously. However, the expression 'thickness increases gradually in the specific region' preferably means that the thickness increases gradually at a constant ratio continuously.

As used herein, the expression 'thickness decreases gradually in a specific region' means that the thickness values measured in the specific region according to a constant directionality by the same method decrease continuously or discontinuously. The ratio of such a decrease in thickness may be maintained constantly within an error range of 5% or less, or may vary discontinuously. However, the expression 'thickness decreases gradually in the specific region' preferably means that the thickness decreases gradually at a constant ratio continuously.

Herein, unless otherwise stated, 'thickness' of each constitutional element may refer to a value measured by using a known thickness gauge capable of measuring the thickness of a battery. For example, the thickness gauge may include VL-50S available from Mitutoyo Corp., but the scope of the present disclosure is not limited thereto.

According to an embodiment of the present disclosure, the thickness of the porous substrate may be determined by removing the porous coating layers from the separator and measuring the thickness of the porous substrate. For example, the porous coating layers may be removed by using a solvent capable of dissolving the porous coating layers contained in the separator, and then the thickness of the remaining porous substrate may be measured.

According to an embodiment of the present disclosure, the thickness of the porous coating layers may be determined by measuring the thickness of the separator, and then subtracting the thickness value of the porous substrate measured as mentioned above from the thickness of the separator, but the method for determining the thickness of the porous coating layers is not limited thereto.

According to an embodiment of the present disclosure, the separator may have a strip-like shape.

According to an embodiment of the present disclosure, the strip-like separator is an elongated strip-shaped separator having a predetermined width, and particularly, may be a rectangular shaped separator having an aspect ratio of 1 or more, more particularly, larger than 1. More particularly, the separator may have a length of about 1,000 mm or more.

FIG. 2 is a schematic view illustrating the top surface of the strip-like separator according to an embodiment of the present disclosure. Referring to FIG. 2, the separator 10 may be divided into the topmost region X and the bottommost region Y to be disposed at the topmost end and the bottommost end, based on the stacking direction, when the separator is folded in a zigzag stacking (ZZS) manner during the manufacture of an electrode assembly, and an internal region Z disposed between the topmost region and the bottommost region.

Figure 3:
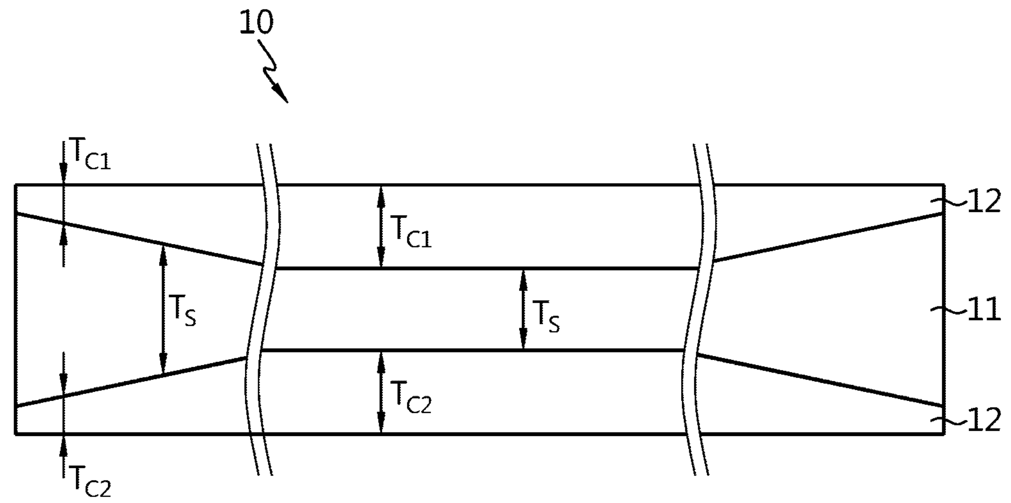
FIG. 3 is a schematic view illustrating the lateral surface of the strip-like separator according to an embodiment of the present disclosure.

FIG. 3 is a schematic view illustrating the lateral surface of the strip-like separator according to an embodiment of the present disclosure. Referring to FIG. 3, the separator 10 includes a porous substrate 11, and porous coating layers 12 formed on both surfaces of the porous substrate. Herein, for the convenience of description, the thickness of the porous substrate is represented by 'Ts', and the total thickness of the porous coating layers is represented by 'Tc'. Herein, the total thickness Tc of the porous coating layers refers to the sum of the thickness Tc1 of the porous coating layer formed on one surface of the porous substrate with the thickness Tc2 of the porous coating layer formed on the other surface of the porous substrate.

Referring to FIG. 3, the thickness Ts of the porous substrate gradually decreases from one end 103 or 104 to a predetermined position 101 or 102 in the direction of the longitudinal center line 10*a*, and the total thickness Tc of the porous coating layers gradually increases, while the total thickness Ts+Tc of the whole separator is maintained constantly.

Figure 4:
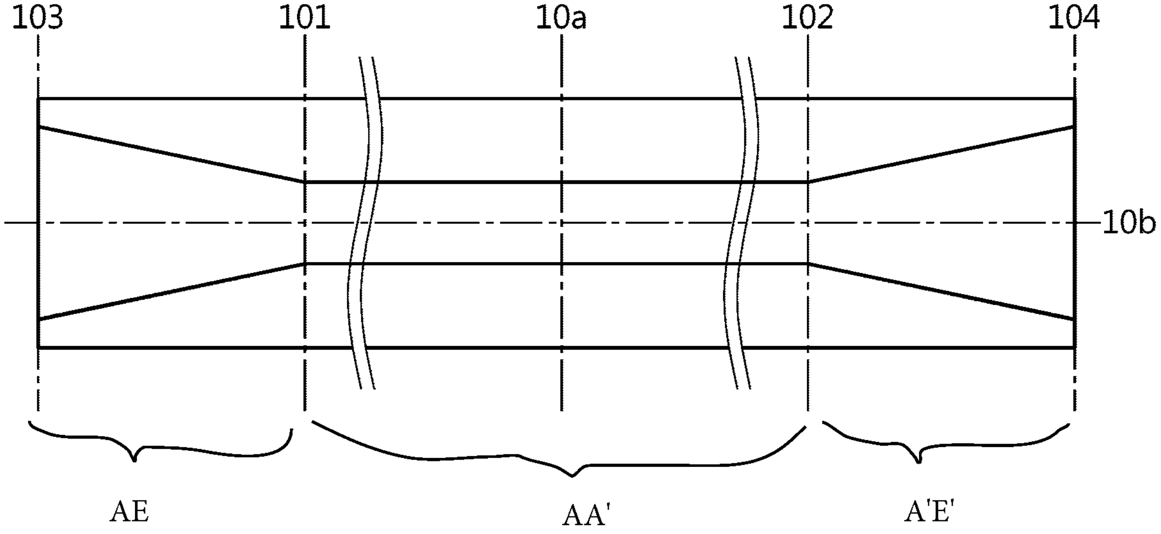
FIG. 4 is a schematic view illustrating the lateral surface of the strip-like separator according to an embodiment of the present disclosure.

FIG. 4 is a schematic view illustrating the lateral surface of the strip-like separator according to an embodiment of the present disclosure. Referring to FIG. 4, the separator includes a region AA' in which the thickness Ts of the porous substrate is maintained constantly between a predetermined position 101 in the direction toward one end 103 and a predetermined position 102 in the direction toward the other end 104, from the longitudinal center 10*a*. In addition, the separator includes a region AE in which the thickness Ts of the porous substrate decreases gradually from one end 103 of the separator to the position 101, and a region A'E' in which the thickness Ts of the porous substrate decreases gradually from the other end 104 to the position 102.

Figure 5:
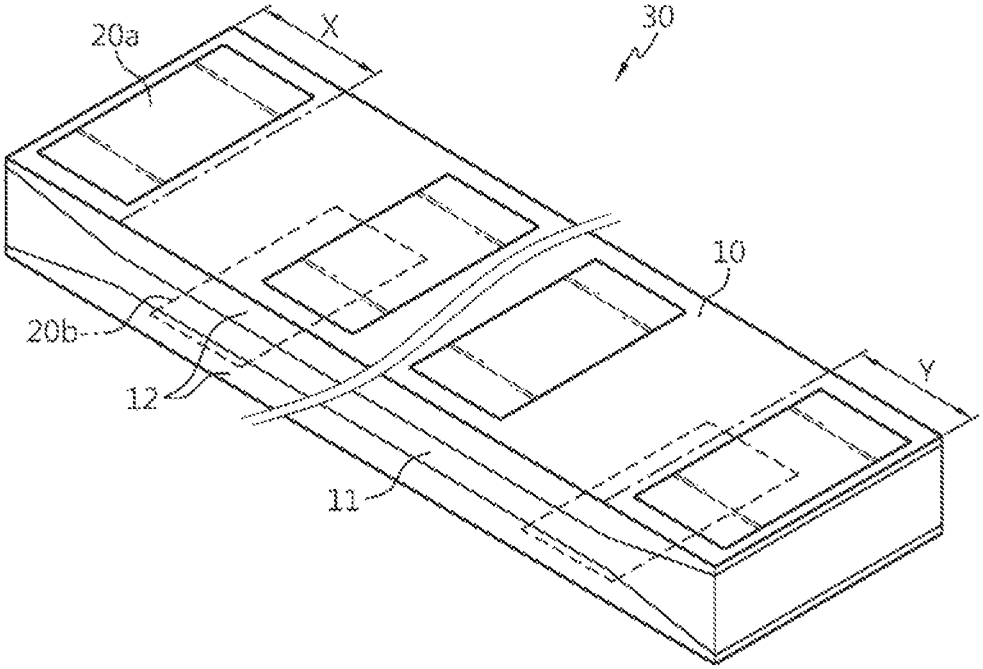
FIG. 5 is a schematic view illustrating the structure of the electrode assembly according to an embodiment of the present disclosure, before it is assembled.

FIG. 5 is a schematic view illustrating the structure of the electrode assembly 30 including unit electrodes 20*a*, 20*b* disposed on the strip-like separator 10 according to an embodiment of the present disclosure, before it is assembled. Referring to FIG. 5, a plurality of first unit electrodes is disposed in parallel with each other at a predetermined interval on one surface of the separator. The interval between one unit electrode and another unit electrode is preferably larger than the width of the first unit electrode, considering that each surface formed by folding of the separator should cover the whole surface of the unit electrode. Meanwhile, a plurality of second unit electrodes may be disposed in the same manner as mentioned above on the other surface of the separator. Herein, as viewed from the lateral side, the first unit electrodes and the second unit electrodes may be disposed alternately so that they do not overlap at all. When the electrodes are disposed alternately as mentioned above, the first unit electrode and the second unit electrode adjacent thereto are preferably spaced apart from each other by a predetermined interval to ensure such a degree of spacing that the separator may be folded. When the electrodes are disposed as mentioned above, it is possible to obtain an electrode assembly including the first unit electrode and the second unit electrode stacked with a separator interposed therebetween, when the separator is folded. The first unit electrode and the second unit electrode have a polarity opposite to each other. For example, the first unit electrode may be a positive electrode and the second electrode may be a negative electrode, or vice versa.

Figure 6:
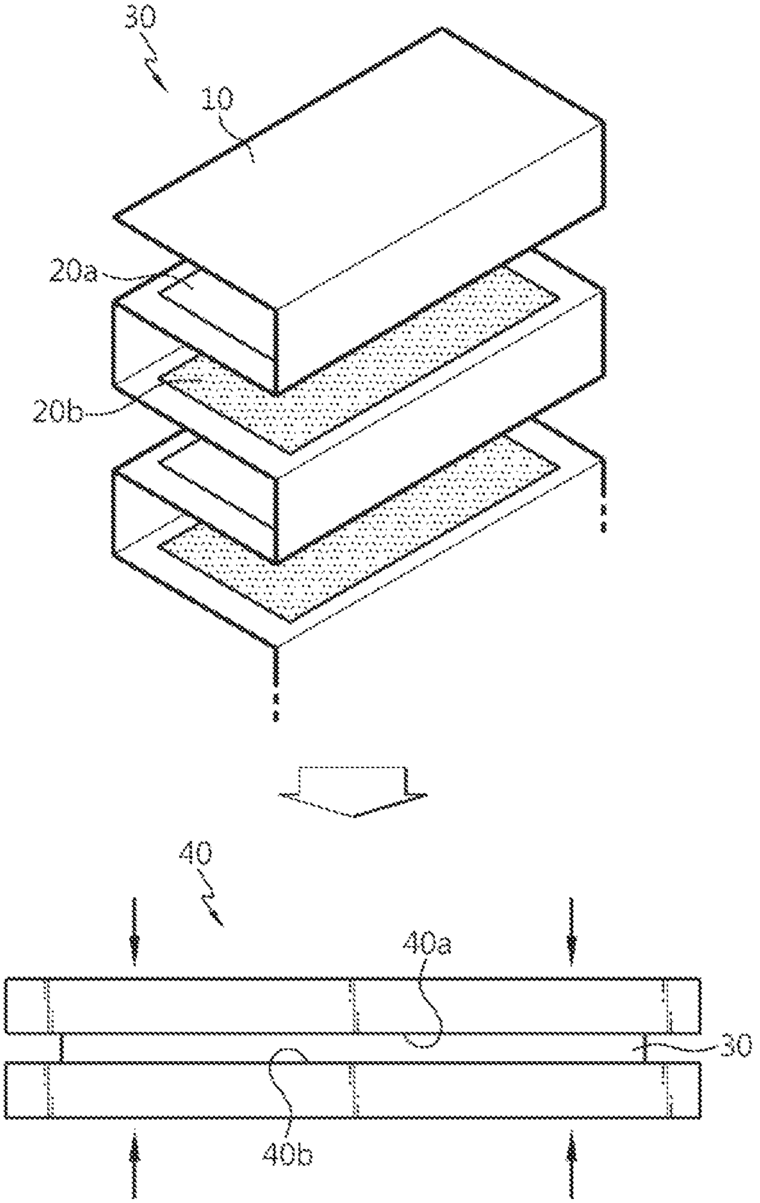
FIG. 6 is a schematic view illustrating the method for manufacturing an electrode assembly according to an embodiment of the present disclosure.

FIG. 6 is a schematic view illustrating the method for manufacturing an electrode assembly according to an embodiment of the present disclosure. Referring to FIG. 6, the separator 10 is folded in a zigzag manner, unit electrodes 20*a*, 20*b* are inserted to portions where the separator is overlapped so that the separator and the unit electrodes are stacked, and the structure stacked after the unit electrodes are inserted are pressed to provide a ZZS-type electrode assembly. When applying pressure to the electrode assembly 30, the pressure applied to the internal region Z is relatively lower as compared to the topmost region 40*a* and the bottommost region 40*b*, thereby causing the problem of degradation of the adhesion between the electrode and the separator in the electrode assembly. Under these circumstances, according to the present disclosure, a novel structure may be introduced to the porous substrate and the porous coating layers in the separator contained in the electrode assembly.

In the electrode assembly according to an embodiment of the present disclosure, the total thickness of the whole separator is maintained constantly, and thus the interval of unit electrodes disposed therein and the folding interval upon the assemblage of the electrode assembly may be retained throughout the electrode assembly. Simultaneously, the thickness of the porous separator gradually decreases from both ends of the separator in the direction of the longitudinal center line, while the thickness of the porous coating layer formed on each surface of the porous substrate gradually increases. For this, when heat and/or pressure is applied through the topmost/bottommost portion during the manufacture of an electrode assembly, the adhesion between the internal electrode and separator can be maintained excellently even though the pressure applied to the internal part of the electrode assembly is low.

According to an embodiment of the present disclosure, the region AA' may be disposed at least partially in the region X and/or the region Y.

Figure 7:
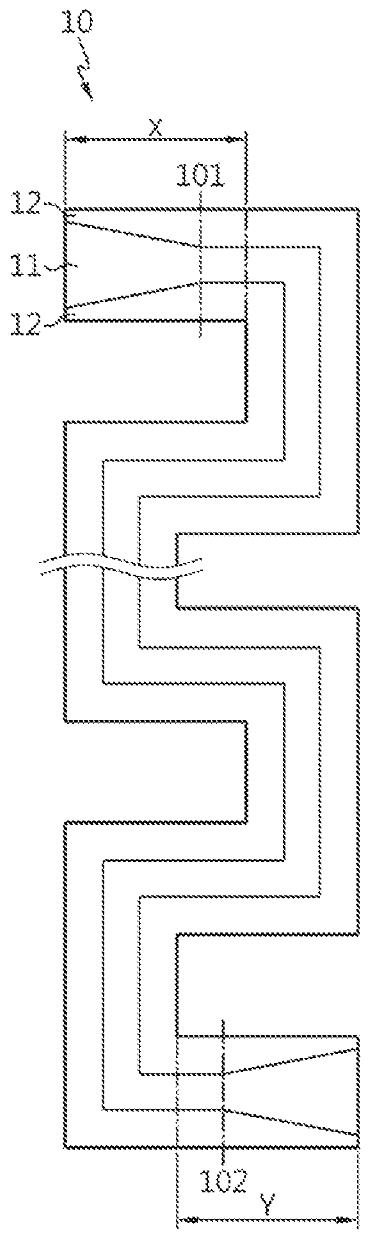
FIG. 7 schematically illustrates the lateral structure of the separator according to an embodiment of the present disclosure, when it is folded in a zigzag manner.

FIG. 7 is a schematic view illustrating the lateral structure of the separator according to an embodiment of the present disclosure, when it is folded in a zigzag manner. Referring to FIG. 7, when the position 101 which is spaced apart from the longitudinal center of the separator 10 by a predetermined interval and at which the thickness of the porous substrate starts to increase toward one end is disposed in the topmost region X, and the position 102 at which the thickness of the porous substrate starts to increase toward the other end is disposed in the bottommost region Y, the region AA' may be partially disposed in the topmost region X and the bottommost region Y.

According to another embodiment of the present disclosure, the region AA' may not be disposed in the topmost region X and the bottommost region Y based on the stacking direction of the electrode assembly, but the region AE and the region A 'E' may be totally or at least partially disposed in the region X and the region Y, preferably.

Particularly, the region Z is one relatively less affected by the heat and/or pressure as compared to the region X and the region Y upon the application of the heat and/or pressure during the manufacture of the electrode assembly. Therefore, preferably, the region AA' may be the same as the region Z or may be disposed in the region Z. In other words, the region X may be included in the region AE, and the region Y may be included in the region A'E'

Figure 8:
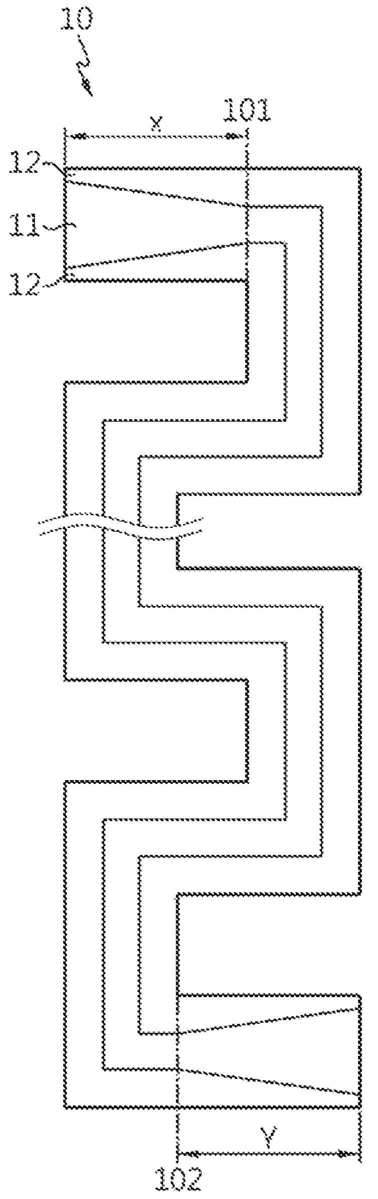
FIG. 8 schematically illustrates the lateral structure of the separator according to an embodiment of the present disclosure, when it is folded in a zigzag manner.

FIG. 8 is a schematic view illustrating the lateral structure of the separator according to another embodiment of the present disclosure, when it is folded in a zigzag manner. Referring to FIG. 8, the position A is a predetermined position 101 where the thickness of the porous substrate decreases from one end of the separator to the longitudinal center line thereof and then starts to be maintained constantly, and is disposed at the internal end of the topmost region X based on the stacking direction of the electrode assembly. In addition, the position A' is a predetermined position 102 where the thickness of the porous substrate decreases from the other end of the separator to the longitudinal center line thereof and then starts to be maintained constantly and is disposed at the internal end of the bottommost region Y based on the stacking direction of the electrode assembly, and thus the whole region AE may coincide with the region X, and the whole region A 'E' may coincide with the region Y.

Figure 9:
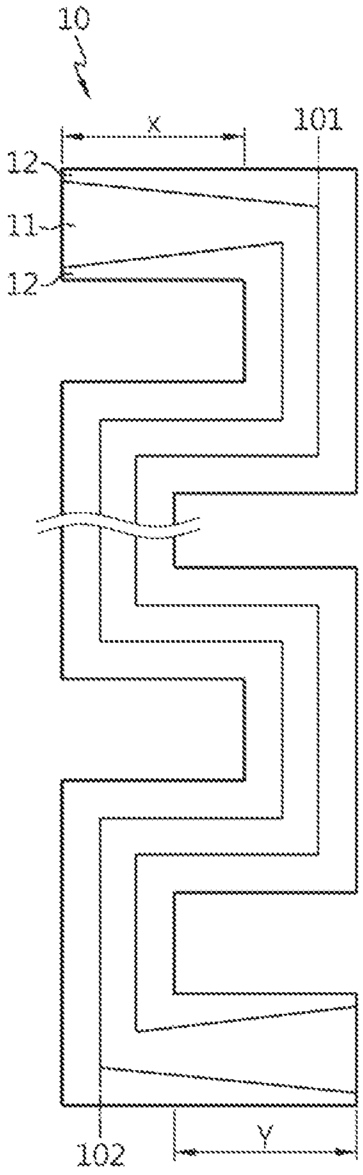
FIG. 9 schematically illustrates the lateral structure of the separator according to an embodiment of the present disclosure, when it is folded in a zigzag manner.

FIG. 9 is a schematic view illustrating the lateral structure of the separator according to still another embodiment of the present disclosure, when it is folded in a zigzag manner. Referring to FIG. 9, the position A is a predetermined position 101 where the thickness of the porous substrate decreases from one end of the separator to the longitudinal center line thereof and then starts to be maintained constantly, and is disposed further inside the electrode assembly as compared to the topmost region X based on the stacking direction of the electrode assembly, while being spaced apart from the region X. In addition, the position A' is a predetermined position 102 where the thickness of the porous substrate decreases from the other end of the separator to the longitudinal center line thereof and then starts to be maintained constantly and is disposed further inside of the electrode assembly as compared to the bottommost region Y based on the stacking direction of the electrode assembly, while being spaced apart from the region Y, and thus the region AE and the region A 'E' may partially include the region X and the region Y, respectively.

For example, according to an embodiment of the present disclosure, the region AA' may be provided by a length corresponding to 10-90%, 15-80%, 20-60%, or 20-50%, based on the total length of the separator. Therefore, each of the region AE and the region A'E' may be provided at each end of the separator in such a manner that the length of the separator calculated by subtracting the length of the region AA' from the total length of the separator may be the same as the total length of the region AE and the region A'E'.

According to an embodiment of the present disclosure, the length of the region AE may be the same as the length of the region A'E'. In other words, each of the length of the region AE and that of the region A'E' may be a half of the length calculated by subtracting the length of the region AA' from the total length of the separator.

According to an embodiment of the present disclosure, in the region AE and the region A 'E', the thickness Ts of the porous substrate decreases from the end of the separator toward the central portion thereof, while the total thickness Tc of the porous coating layers increases. Therefore, even when heat and/or pressure is applied to the topmost/bottommost end based on the stacking direction during the manufacture of the electrode assembly, it is possible to sufficiently realize the adhesion between the electrode and the separator in the electrode assembly. However, the effects of the present disclosure are not limited thereto.

According to an embodiment of the present disclosure, the porous coating layers formed on both surfaces of the porous substrate may be symmetric to each other based on the center line 10*b* of the separator in the thickness direction.

Referring to FIG. 3 and FIG. 4, when the porous coating layer formed on the top surface of the porous substrate is called the first porous coating layer, and the porous coating layer formed on the bottom surface of the porous substrate is called the second porous coating layer, the first porous coating layer and the second porous coating layer may be formed axially symmetrically to each other based on the central line 10*b* of the separator in the thickness direction.

Particularly, the porous coating layers formed on both surfaces of the porous substrate are formed symmetrically to each other based on the center line of the separator in the thickness direction, and thus the thickness of one porous coating layer and that of the other porous coating layer may be the same or different by 10% or less from each other at an optional same position orthogonal to the longitudinal direction of the separator.

For example, the thickness Tc1 of the first porous coating layer and the thickness Tc2 of the second porous coating layer, positioned on an imaginary line orthogonal to the longitudinal direction of the separator at an optional position of the separator, may be the same, or when they are different, the difference in thickness may be 10% or less.

More particularly, the thickness of the first porous coating layer and the thickness of the second porous coating layer may be different from each other by 10% or less, 8% or less, 5% or less, 4% or less, 3% or less, 2% or less, 1% or less, or 0% (i.e. the same thickness).

According to an embodiment of the present disclosure, the separator may be formed to have a symmetric structure based on the longitudinal center 10*a* of the separator.

According to an embodiment of the present disclosure, the separator may be formed to have a symmetric structure based on the longitudinal center line 10*a* and the thickness direction center line 10*b*. Referring to FIG. 6, the region AE from the position 101 to one end 103 and the region A'E' from the position 102 at the opposite side to the other end 104 may be formed to have a symmetric structure based on the longitudinal center line 10_a_ and the thickness direction center line 10_b_.

Particularly, in the region AE and the region A 'E' of the separator, the thickness Ts of the porous substrate of one side and the thickness Ts of the porous substrate of the other side, formed at an optional position spaced apart from the longitudinal center line 10_a_ of separator, may be the same or may show a difference in thickness of 10% or less.

More particularly, in the region AE and the region A'E' of the separator, the thickness Ts of the porous substrate of one side and the thickness Ts of the porous substrate of the other side, formed at an optional position spaced apart from the longitudinal center line 10_a_ of separator may show a difference in thickness of 10% or less, 8% or less, 5% or less, 4% or less, 3% or less, 2% or less, 1% or less, or 0% (i.e. the same thickness).

According to an embodiment of the present disclosure, the ratio Ts/Tc of the thickness Ts of the porous substrate based on the total thickness Tc of the porous coating layers may be 0.5-5 over the whole separator. Particularly, the ratio Ts/Tc may be 0.8-3, 1-2, or 1-1.8. In the electrode assembly, the thickness Ts of the porous substrate gradually decreases toward the end based on the longitudinal direction of the separator, while the total thickness Tc of the porous coating layers gradually increases, and thus the ratio Ts/Tc may decrease toward the end based on the longitudinal direction of the separator.

According to another embodiment of the present disclosure, the ratio Ts/Tc of the thickness Ts of the porous substrate based on the total thickness Tc of the porous coating layers is 1-5 at the position A. Particularly, the ratio Ts/Tc at the position A may be 1-3, 1-2, or 1.5-1.8. In the electrode assembly, as described above, the thickness Ts of the porous substrate is maintained constantly in the region AA' from the position A to the position A', and thus the ratio Ts/Tc at the position A may represent the maximum value of the ratio Ts/Tc over the whole separator.

According to an embodiment of the present disclosure, the porous substrate refers to a substrate which functions as an ion-conducting barrier that allows ions to pass therethrough, while interrupting an electrical contact between a negative electrode and a positive electrode, and has a plurality of pores formed therein. The pores are interconnected so that gases or liquids may pass from one surface of the substrate to the other surface of the substrate. A porous polymer film including a thermoplastic resin may be used as the porous substrate with a view to imparting a shutdown function. Herein, the term 'shutdown function' refers to a function of melting of the thermoplastic resin to close the pores of the porous substrate when the temperature of a battery is increased, thereby interrupting migration of ions and preventing the thermal runaway of a battery. The thermoplastic resin preferably has a melting point of less than about 200° C., and the thermoplastic resin is polyolefin, more preferably.

According to an embodiment of the present disclosure, the porous substrate may have a porosity of 30-90%, 35-80%, 40-70%, 40-60%, or 40-50%. For example, the porosity of the porous substrate may be calculated according to the formula of [True density of the material contained in the porous substrate-Density of the porous substrate/True density X 100(%)].

According to an embodiment of the present disclosure, the thickness of the porous substrate is not particularly limited, as long as it satisfies the above-defined range of ratio Ts/Tc. For example, the porous substrate may have a thickness of 5-300 μm.

According to an embodiment of the present disclosure, the porous coating layer is formed on each of the top surface and the bottom surface of the porous substrate, and includes inorganic particles. The inorganic particles are packed in the porous coating layer in a closely packed state to provide a plurality of micropores resulting from the interstitial volumes formed among the inorganic particles.

According to an embodiment of the present disclosure, the porous coating layer further includes a binder resin, and the inorganic particles may be totally or at least partially surface-coated with the binder resin. Herein, the inorganic particles are bound to one another in a surface binding manner and/or dot binding manner by means of the binder resin. For example, the inorganic particles and the binder resin may be contained in the porous coating layer at a weight ratio of 95:5-50:50.

According to an embodiment of the present disclosure, there is no particular limitation in the inorganic particles, as long as they are electrochemically stable. In other words, there is no particular limitation in the inorganic particles, as long as they cause no oxidation and/or reduction in the range (e.g. 0-5 V based on $Li/Li^+$) of operating voltage of an applicable electrochemical device. Non-limiting examples of the inorganic particles may include: $BaTiO_3$, $Pb(Zr, Ti)O_3$ (PZT), Pb1−xLaxZr1−yTiyO3 (PLZT, 0<x<1, 0<y<1), $Pb(Mg_{1/3}Nb_{2/3})O_3$—$PbTiO_3$ (PMN-PT), hafnia ($HfO_2$), $SrTiO_3$, $SnO_2$, $CeO_2$, MgO, NiO, CaO, ZnO, $ZrO_2$, $SiO_2$, $Y_2O_3$, $Al_2O_3$, SiC, $TiO_2$, or the like. Such inorganic particles may be used alone or in combination.

According to an embodiment of the present disclosure, when the binder resin is contained in the porous coating layer, the binder resin may include a polyvinylidene fluoride (PVDF)-based resin, for example. According to an embodiment of the present disclosure, the PVDF-based resin may include at least one of homopolymer of vinylidene fluoride (i.e. polyvinylidene fluoride), copolymer of vinylidene fluoride with a copolymerizable monomer and a mixture thereof. According to an embodiment of the present disclosure, the monomer may include a fluorinated monomer and/or a chlorinated monomer. Non-limiting examples of the fluorinated monomer may include: vinyl fluoride; trifluoroethylene (TrFE); chlorofluoroethylene (CTFE); 1,2-difluoroethylene; tetrafluoroethylene (TFE); hexafluoropropylene (HFP); perfluoro(alkylvinyl)ether, such as perfluoro(methylvinyl)ether (PMVE), perfluoro(ethylvinyl)ether (PEVE) or perfluoro(propylvinyl)ether (PPVE); perfluoro(1,3-dioxole); perfluoro(2,2-dimethyl-1,3-dioxol) (PDD); or the like, and at least one of such fluorinated monomers may be used.

According to an embodiment of the present disclosure, the PVDF-based resin may have a Tm of 140° C. or lower in terms of the adhesion when carrying out adhesion under heating. For this purpose, the PVDF-based resin may include a copolymer of a vinylidene fluoride unit with another monomer copolymerizable with the vinylidene fluoride unit. Such a copolymer may include PVDF-TrFE, PVDF-TFE, PVDF-CTFE and PVDF-HFP, and at least one of them may be used.

Meanwhile, the binder resin may further include a (meth) acrylate polymer resin, besides the vinylidene fluoride-based binder resin, considering improvement of adhesion. The (meth)acrylic polymer includes (meth)acrylate as a monomer, and non-limiting examples of the (meth)acrylic polymer may include those including, as a monomer, butyl (meth)acrylate, 2-ethylhexyl (meth)acrylate, ethyl (meth)

acrylate, methyl (meth)acrylate, n-propyl (meth)acrylate, isopropyl (meth)acrylate, t-butyl (meth)acrylate, pentyl (meth)acrylate, n-octyl (meth)acrylate, isooctyl (meth)acrylate, isononyl (meth)acrylate, lauryl (meth)acrylate, tetradecyl (meth)acrylate, or the like.

According to an embodiment of the present disclosure, the separator may be obtained by applying a slurry for forming an inorganic coating layer containing the inorganic particles, or the binder resin and the inorganic particles on the porous substrate, and drying the solvent and/or the binder resin to form a porous coating layer integrally on the porous substrate. The method for manufacturing a separator is not limited to any particular method, as long as the porous coating layer is formed on each of the top surface and the bottom surface of the porous substrate, and the separator having the above-mentioned shape can be obtained.

According to an embodiment of the present disclosure, the thickness of the porous coating layer is not particularly limited, as long as it satisfies the above-defined range of ratio Ts/Tc. For example, the thickness of the porous coating layer may be 3-50 μm.

The electrode assembly according to the present disclosure includes the separator having the above-mentioned shape, and at least a pair of unit electrodes disposed on the separator at a predetermined interval.

According to an embodiment of the present disclosure, the unit electrode may be a conventional positive electrode and/or negative electrode used for an electrochemical device, wherein each of the positive electrode and the negative electrode may include an electrode active material coated on a current collector, and the size or shape thereof is not particularly limited.

When the electrode is a positive electrode, particular examples of the positive electrode active material may include, but are not limited to: lithium manganese oxides, lithium cobalt oxide, lithium nickel oxides, lithium iron oxides or lithium composite oxides prepared through a combination thereof, or a mixture of two or more of them.

When the electrode is a negative electrode, particular examples of the negative electrode active material may include, but are not limited to: lithium metal or lithium alloy, soft carbon, hard carbon, natural graphite, Kish graphite, pyrolytic carbon, mesophase pitch-based carbon fibers, meso-carbon microbeads, mesophase pitches, petroleum or coal tar pitch-derived cokes, or a mixture of two or more of them.

The electrode assembly having the above-mentioned structure according to the present disclosure shows significantly improved heat resistance and impact resistance, even when pressure is applied to the electrode assembly in the stacking direction through a hot pressing process, and thus the electrode assembly can provide an excellent effect of retaining its shape.

According to an embodiment of the present disclosure, the adhesion between the electrode and the separator at an optional position of the electrode assembly, after the electrode assembly is fixed through a hot pressing process, may be 20% or more based on 100% of the adhesion between the electrode and the separator at the topmost end of the electrode assembly in the stacking direction.

According to an embodiment of the present disclosure, the hot pressing process may be carried out by applying a pressure of 3-10 MPa at a temperature of 50-110° C.

According to another embodiment of the present disclosure, the hot pressing process may be carried out particularly by applying a pressure of 10 ton at a temperature of 90° C. for 15 seconds. Herein, the adhesion between the electrode and the separator at an optional position of the electrode assembly, after the electrode assembly is fixed through a hot pressing process, may be 20% or more based on 100% of the adhesion between the electrode and the separator at the topmost end of the electrode assembly in the stacking direction.

According to still another embodiment of the present disclosure, the adhesion between the electrode and the separator at an optional position of the electrode assembly, after the electrode assembly is fixed through a hot pressing process, may be particularly 30% or more, 40% or more, 50% or more, 60% or more, 70% or more, or 80% or more, and more particularly, 90% or more, based on 100% of the adhesion between the electrode and the separator at the topmost end of the electrode assembly in the stacking direction.

Herein, the adhesion between the electrode and the separator at an optional position of the electrode assembly, after the electrode assembly is fixed through a hot pressing process, may be determined by carrying out a peel test with a UTM instrument (available from Instron Co.) Particularly, the separator is sampled by a width of 25 mm from the electrode assembly hot-pressed in the above-mentioned manner, and then the adhesion may be determined by evaluating the peel force between the electrode and the separator by using a UTM instrument under the conditions of 180° peel and 300 mm/min.

According to an embodiment of the present disclosure, the adhesion between the electrode and the separator at an optional position of the electrode assembly fixed as mentioned above may be 20 gf/25 mm or more.

For example, according to another embodiment of the present disclosure, the adhesion between the electrode and the separator at an optional position of the electrode assembly fixed as mentioned above may be 30 gf/25 mm or more, 40 gf/25 mm or more, 50 gf/25 mm or more, 60 gf/25 mm or more, 70 gf/25 mm or more, or 80 gf/25 mm or more, and more particularly 90 gf/25 mm to 100 gf/25 mm.

According to an embodiment of the present disclosure, the separator used for the electrode assembly fixed as mentioned above may have a lower air permeability at the central portion as compared to the air permeability at both ends thereof in the longitudinal direction.

When the separator according to the present disclosure is not used, but a conventional separator, wherein the thickness of each of a porous substrate and that of a porous coating layer is constant, is used, a deviation in air permeability is generated when the electrode assembly is thermally fixed, wherein the air permeability of the internal region of the separator is significantly lower than the air permeability of the topmost region and/or the bottommost region of the electrode assembly, based on the stacking direction. However, when using the separator according to the present disclosure, the air permeability of the topmost region and/or the bottommost region of the electrode assembly based on the stacking direction of the electrode assembly may be reduced to the level of the air permeability of the internal region, when the electrode assembly is thermally fixed, thereby providing an effect of reducing such a deviation in air permeability. In this manner, it is possible to effectively improve the problem of degradation of the output of the battery and degradation of the performance caused by repeating cycles through such improved air permeability. However, the effects of the present disclosure are not limited thereto.

Therefore, in the separator according to an embodiment of the present disclosure, when the thickness Ts of the porous substrate is maintained constantly from the position A directing one end from the longitudinal center C to the position A' directing the other end therefrom, the thickness Ts of the porous substrate in at least a part or the whole of the region AE from the position A to one end E and the region A'E' from the position A' to the other end E' decreases gradually toward the central portion of the separator, and the total thickness Tc of the porous coating layers increases toward the central portion, the air permeability of the region AA' between the position A and the position A' may be 50% or more based on the air permeability of at least one region of the region AE and the region A'E', after the electrode assembly is thermally fixed. Herein, the thermal fixing condition is the same as described above.

More particularly, after the electrode assembly is thermally fixed, the air permeability of the region AA' may be 50-100%, 55-99%, 60-95%, 70-95%, 80-95%, 85-95%, 90-95%, or 91%, based on the air permeability of at least one region of the region AE and the region A'E'.

As used herein, the air permeability (Gurley) of the separator may be determined by the method of ASTM D726-94. Herein, 'Gurley' refers to the resistance against air flow and may be measured by a Gurley densometer. Particularly, the air permeability value measured as mentioned above may be expressed as time (second), i.e. air permeation time, required for 100 cc of air to pass through a section of 1 $in^2$ of a separator to be tested under a pressure of 12.2 in $H_2O$. For example, according to an embodiment of the present disclosure, the air permeability may be determined by using EG01-55-1MR instrument available from Asahi seich Co.

According to an embodiment of the present disclosure, the electrode assembly fixed as mentioned above may show a capacity retention of 80% or more, such as 90% or more, or 95% or more, after 500 charge/discharge cycles, but the scope of the present disclosure is not limited thereto.

According to an embodiment of the present disclosure, the electrode assembly fixed as mentioned above may have a thickness corresponding to 110% or less, such as 105% or less, of the initial thickness, after 500 charge/discharge cycles, but the scope of the present disclosure is not limited thereto.

According to an embodiment of the present disclosure, the casing may be a battery casing used conventionally in the art, and there is no particular limitation in the outer shape of the casing depending on the purpose of use of a battery. For example, the casing may have a cylindrical shape using a can, a prismatic shape, a pouch-like shape, a coin-like shape, or the like.

After the electrode assembly is finished, it may be received in a casing in a conventional manner and then sealed to obtain an electrochemical device. Herein, the electrochemical device may be a lithium secondary battery, for example.

MODE FOR DISCLOSURE

Examples will be described more fully hereinafter so that the present disclosure can be understood with ease. However, the following examples are for illustrative purposes only, and the scope of the present disclosure is not limited thereto.

Example 1

[Manufacture of Separator]

A separator was obtained by the following method.

The porosity of each constitutional element was calculated according to the formula of [True density of the material applied to the constitutional element-Density of the corresponding element/True density X 100(%)].

In each constitutional element, the thickness was measured by using a thickness gauge (VL-50S, available from Mitutoyo).

Preparation of Porous Substrate

Three types of polyethylene polymers having a different molecular weight and polypropylene polymer were mixed with an antioxidant at a suitable ratio to prepare a porous substrate used for a separator by a known method. The three types of polyethylene polymers were PE40 (Mw 400,000 g/mol), PE 90 (Mw 900,000 g/mol) and PE 150 (Mw 1,500,000 g/mol), and the polypropylene polymer was PP 35 (Mw 350,000 g/mol). The resultant porous substrate had a porosity of 45%.

The porous substrate was prepared in such a manner that it had a total width of 350 mm and a length of 1 m, the thickness measured at each of both ends was 15 μm, and the thickness gradually decreased from both ends to a point of 0.3 m in the longitudinal direction and was maintained constantly at 12 μm from a point of 0.3 m.

Preparation of Porous Coating Layer

PVDF-HFP (Mw 500,000 g/mol, HFP 15 wt %) as a binder was mixed with inorganic particles at a weight ratio of 80:20 to prepare a slurry for an inorganic coating layer.

The resultant slurry for an inorganic coating layer was applied to the whole surface of the porous substrate through a dip coating process and dried through a humidified phase separation process, thereby forming a porous coating layer on each of the top surface and the bottom surface of the porous substrate.

The porous coating layer formed on each of the top surface and the bottom surface was prepared in such a manner that it had a thickness of 4.5 μm as determined at both ends, and the thickness gradually increased from both ends to a point of 0.3 m in the longitudinal direction and was maintained constantly at 6 μm from a point of 0.3 m.

In this manner, a separator was obtained, and the total thickness of the whole separator was maintained constantly at 24 μm.

[Manufacture of Electrode Assembly]

The separator obtained as described above was used to obtain an electrode assembly. Particularly, 17 positive electrodes and 16 negative electrodes were disposed alternately on the top surface and the bottom surface of the separator. Herein, the point where the end of the positive electrode exists on one surface and the point where the end of the negative electrode exists on the other surface were alternately disposed apart from each other in such a manner that the horizontal interval on the flat surface might be 3 mm. Lithium cobalt oxide, LCO, was used as the positive electrode active material, while graphite was used as the negative electrode active material (N/P ratio >100).

Comparative Example 1

[Manufacture of Separator]

Preparation of Porous Substrate

A porous substrate was obtained in the same manner as Example 1, except that the porous substrate was formed to have a constant thickness of 15 μm without any change in thickness throughout the longitudinal direction.

Preparation of Porous Coating Layer

Porous coating layers were formed in the same manner as Example 1, except that the porous coating layers were formed to have a constant thickness of 9 μm without any change in thickness throughout the longitudinal direction. In this manner, a separator having a constant thickness of 24 μm was obtained.

[Manufacture of Electrode Assembly]

An electrode assembly was obtained in the same manner as Example 1, except that the separator obtained as described above was used.

[Evaluation of Adhesion after Hot Pressing Process]

The electrode assembly obtained as described above was pressed by using a hot pressing machine under the conditions of 90° C. and 10 ton for 15 seconds, and then the separator was sampled from the cell to be evaluated by a width of 25 mm based on the separator. Then, a UTM instrument (Instron Co.) was used to determine the force upon the peeling of the electrode from the separator under the conditions of 180° peel at a rate of 300 mm/min. The results are shown in the following Table 1.

The adhesion was determined at each of the endmost portion and the central portion of the electrode assembly according to each of Example 1 and Comparative Example 1. Herein, the adhesion at the endmost portion was evaluated as the adhesion between the electrode and the separator of the unit cell disposed at the topmost end of each electrode assembly, and the adhesion at the central portion was evaluated as the adhesion between the electrode and the separator of the unit cell disposed at the center of each electrode assembly.

TABLE 1

| | Adhesion (gf/25 mm) | | Ratio of adhesion %) |
|---|---|---|---|
| | Endmost portion | Central portion | (Central portion/Endmost portio) |
| Comp. Ex. 1 | 88 | 13 | 15 |
| Ex. 1 | 92 | 87 | 95 |

As can be seen from Table 1, after hot pressing, Comparative Example 1 shows a large difference in adhesion between the separator and the electrode at the central portion, while Example 1 shows excellent adhesion throughout the whole electrode assembly.

[Evaluation of Air Permeability]

To evaluate a change in air permeability of the separator according to each of Example 1 and Comparative Example 1 after hot pressing, the separator according to each of Example 1 and Comparative Example 1 was pressed under the conditions of 90° C. and 10 ton for 15 seconds.

Then, the regions (endmost region) from both ends of the hot pressed separator to a point of 0.3 m in the longitudinal direction and the region (central region) between the points of 0.3 m from both ends in the longitudinal direction were determined in terms of air permeability.

Particularly, the air permeability was determined by using EG01-55-1MR instrument available from Asahi seich Co. for an area of 1 $in^2$ of the corresponding region. The following Table 2 shows the average values of the air permeability test results obtained from 6 portions for each of the endmost portion and the central portion.

TABLE 2

| | Air permeability (sec/100 cc) | | Ratio of air permeability |
|---|---|---|---|
| | Endmost portion | Central portion | (Central portion/Endmost portion * 100) |
| Comp. Ex. 1 | 151 | 75 | 49% |
| Ex. 1 | 81 | 74 | 91% |

As can be seen from Table 2, after hot pressing, the separator according to Comparative Example 1 shows a large deviation in air permeability at the central portion as compared to the endmost portion, while the separator according to Example 1 shows a significantly reduced deviation in air permeability at the central portion as compared to the endmost portion.

[Evaluation of Battery Performance]

An electrochemical charger was used to carry out 500 charge/discharge cycles. Herein, the cell was charged to a voltage of 4.3 V at a current density of 0.1 C-rate, and discharged to a voltage of 2.5 V at the same current density. Then, the capacity retention and thickness swelling ratio were evaluated as follows.

The target capacity retention was taken as 80% or more after 500 cycles based on the initial capacity. In addition, the target thickness swelling ratio was taken as 110% or less after 500 cycles based on the initial thickness.

$$\text{Capacity retention (\%)} = (\text{Capacity after 500 cycles/Initial capacity}) \times 100$$

The capacity retention and thickness swelling ratio were evaluated as described above. The results are shown in the following Table 3.

TABLE 3

| | Capacity after 500 cycles based on initial capacity (%) | Thickness after 500 cycles based on initial thickness (%) |
|---|---|---|
| Comp. Ex. 1 | 68 | 117 |
| Ex. 1 | 95 | 103 |

As can be seen from Table 3, Example 1 shows better results as compared to Comparative Example 1 in terms of inhibition of capacity degradation and inhibition of thickness swelling. Particularly, it can be seen that when using the electrode assembly according to Comparative Example 1, it is not possible to satisfy the target capacity retention and target thickness swelling ratio.

It is thought that this is because the electrode assembly according to Comparative Example 1 has poor internal adhesion to cause an increase in electrode-separator resistance and thickness swelling.

The present disclosure has been described in detail with reference to examples and drawings. However, it should be understood that various changes and modifications within the scope of the disclosure will become apparent to those skilled in the art from this detailed description.

| [Description of Drawing Numerals] | |
|---|---|
| 1: Electrode assembly | 3: Separator |
| 5: Positive electrode | 7: Negative electrode |
| 10: Separator | 11: Porous separator |

-continued

| [Description of Drawing Numerals] | |
|---|---|
| 12: Porous coating layer | 10a: Longitudinal center of separator |
| 10b: Center of separator in thickness direction | 20a: Negative electrode |
| 20b: Positive electrode | 30: Electrode assembly |
| 40: Electrode assembly pressing process | |
| 40a: Topmost region of electrode assembly | |
| 40b: Bottommost region of electrode assembly | |
| 101: Position A | 102: Position A' |
| 103: Position E | 104: Position E' |
| X: Topmost region based on stacking direction | |
| Y: Bottommost region based on stacking direction | |
| Z: Internal region based on stacking direction | |
| Ts: Thickness of porous substrate | |
| Tc1, Tc2: Thickness of porous coating layer | |

What is claimed is:

1. A separator comprising:

a porous substrate made of a polymer material;

a first porous coating layer on a first surface of the porous substrate, the first porous coating layer containing inorganic particles; and a second porous coating layer on a second surface of the porous substrate opposite the first surface, the second porous coating layer containing inorganic particles, wherein the separator has opposite ends and a central portion, wherein a thickness (Ts) of the porous substate decreases gradually from the opposite ends toward the central portion based on a longitudinal direction of the separator, a thickness of the central portion being constant, wherein a total thickness (Tc) of the first and second porous coating layers in end portions of the first porous coating layer and second porous coating layer increases gradually from the opposite ends toward the central portion, wherein a total thickness (Ts+Tc) of the separator is constant, and wherein the separator is folded in a zigzag manner.

2. The separator according to claim 1, wherein the thickness (Ts) of the porous substrate is constant from a longitudinal center (C) of the separator to a first predetermined position (A) in a direction toward a first end (E) of the opposite ends and to a second predetermined position (A') in a direction toward a second end (E') of the opposite ends, and wherein the thickness (Ts) of the porous substrate in a whole or at least a part of a first region (AE) from the first predetermined position (A) to the first end (E) and a second region (A'E') from the second predetermined position (A') to the second end (E') decreases gradually toward the central portion of the separator, while the total thickness (Tc) of the first and second porous coating layers increases toward the central portion.

3. The separator according to claim 1, wherein the first and second porous coating layers are symmetrical to each other based on the central portion of the separator in the longitudinal direction of the separator, and a thickness of the first porous coating layer and a thickness of the second porous coating layer are the same or have a difference in thickness of 10% or less at a same position orthogonal to the longitudinal direction of the separator.

4. The separator according to claim 2, wherein the separator is symmetrical based on the longitudinal center (C) in the longitudinal direction, and wherein the thickness (Ts) of the porous substrate in the first region (AE) and the thickness (Ts) of the porous substrate in the second region (A'E') at positions spaced apart from the longitudinal center (C) of the separator by the same interval are the same or have a difference in thickness of 10% or less.

5. The separator according to claim 1, wherein a ratio (Ts/Tc) of the thickness (Ts) of the porous substrate and the total thickness (Tc) of the first and second porous coating layers is 0.5-5 over the whole separator.

6. The separator according to claim 2, wherein a ratio (Ts/Tc) of the thickness (Ts) of the porous substrate and the total thickness (Tc) of the first and second porous coating layers is 1-5 at the first predetermined position (A).

7. An electrode assembly comprising;

unit electrodes; and the separator according to claim 1, wherein the unit electrodes are located at portions where the separator is overlapped.

8. The electrode assembly according to claim 7, wherein the thickness (Ts) of the porous substrate is constant from a longitudinal center (C) of the separator to a first predetermined position (A) in a direction toward a first end (E) of the opposite ends and to a second predetermined position (A') in a direction toward a second end (E') of the opposite ends, wherein a first region (AE) from the first predetermined position (A) to the first end (E) and a second region (A'E') from the second predetermined position (A') to the second end (E') are totally or at least partially disposed at a topmost end and a bottommost end based on a stacking direction of the electrode assembly, and wherein the thickness (Ts) of the porous substrate decreases gradually toward the central portion of the separator, while the total thickness (Tc) of the first and second porous coating layers increases toward the central portion.

9. The electrode assembly according to claim 8, wherein a region (AA') from the first predetermined position (A) to the second predetermined position (A') is not disposed at the topmost end and the bottommost end based on the stacking direction of the electrode assembly, and wherein the thickness (Ts) of the porous substrate at the topmost end and the bottommost end based on the stacking direction of the electrode assembly decreases toward the central portion of the separator.

10. The electrode assembly according to claim 7, wherein adhesion between one of the unit electrodes and the separator at a position other than the topmost end and a bottommost end of the electrode assembly, after being fixed through a hot pressing process, is at least 20% based on 100% of the adhesion between another one of the unit electrodes and the separator at the topmost end in a stacking direction of the electrode assembly.

11. The electrode assembly according to claim 10, wherein the adhesion between the one of the unit electrodes and the separator at the position other than the topmost end and the bottommost end is 20 gf/25 mm or more.

12. The electrode assembly according to claim 7, wherein the central portion of the separator, after being fixed through a hot pressing process, has a lower air permeability as compared to the air permeability of the opposite ends of the separator.

13. The electrode assembly according to claim 7, wherein the thickness (Ts) of the porous substrate is constant from a longitudinal center (C) of the separator to a first predetermined position (A) in a direction toward a first end (E) of the opposite ends and to a second predetermined position (A') in a direction toward a second end (E') of the opposite ends, wherein the thickness (Ts) of the porous substrate in a whole or at least a part of a first region (AE) from the first predetermined position (A) to the first end (E) and a second region (A'E') from the second predetermined position (A') to the second end (E') decreases gradually toward the central portion of the separator, while the total thickness (Tc) of the first and second porous coating layers increases toward the central portion, and wherein a region (AA') between the first predetermined position (A) and the second predetermined position (A') has an air permeability of 50% or more based on the air permeability of at least one of the first region (AE) and the second region (A'E'), after being fixed through a hot pressing process.

14. An electrochemical device comprising the electrode assembly according to claim 7, wherein the electrode assembly is received in a battery casing.

15. The electrochemical device according to claim 14, wherein the electrochemical device is a lithium secondary battery.

16. The separator according to claim 1, wherein the separator has a top layer and a bottom layer, and wherein a width of end potions of the first porous coating layer and the second porous coating layer is less than a width of the top layer and the bottom layer, respectively.

17. The separator according to claim 1, wherein the separator has a top layer and a bottom layer and an internal region between the top layer and the bottom layer, and wherein a thickness of the separator is constant in the internal region.

18. The separator according to claim 1, wherein the separator has a top layer and a bottom layer and a plurality of intermediate layers between the top layer and the bottom layer, and wherein a thickness of each of the plurality of intermediate layers is constant.

* * * * *